UNITED STATES PATENT OFFICE.

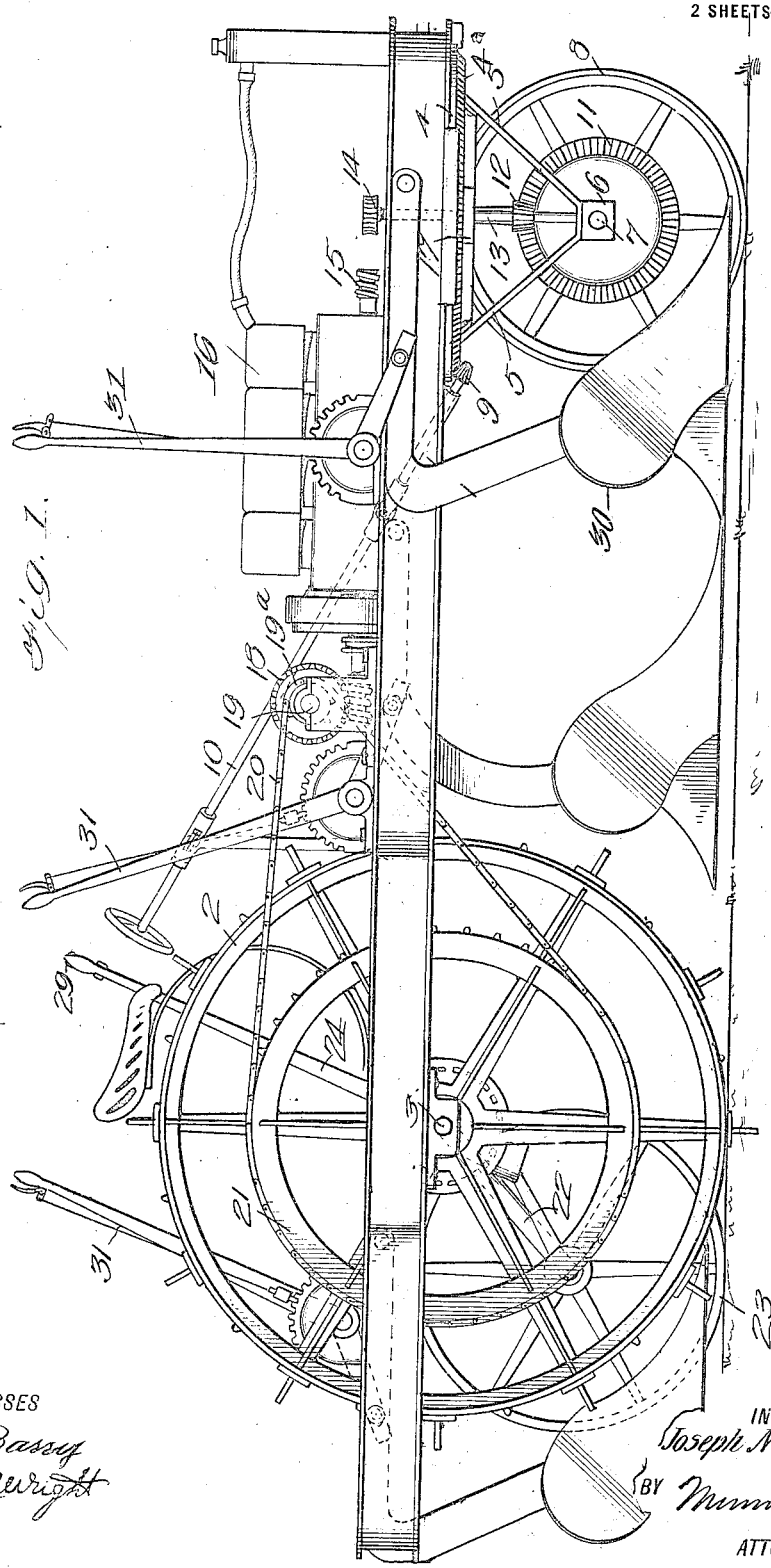

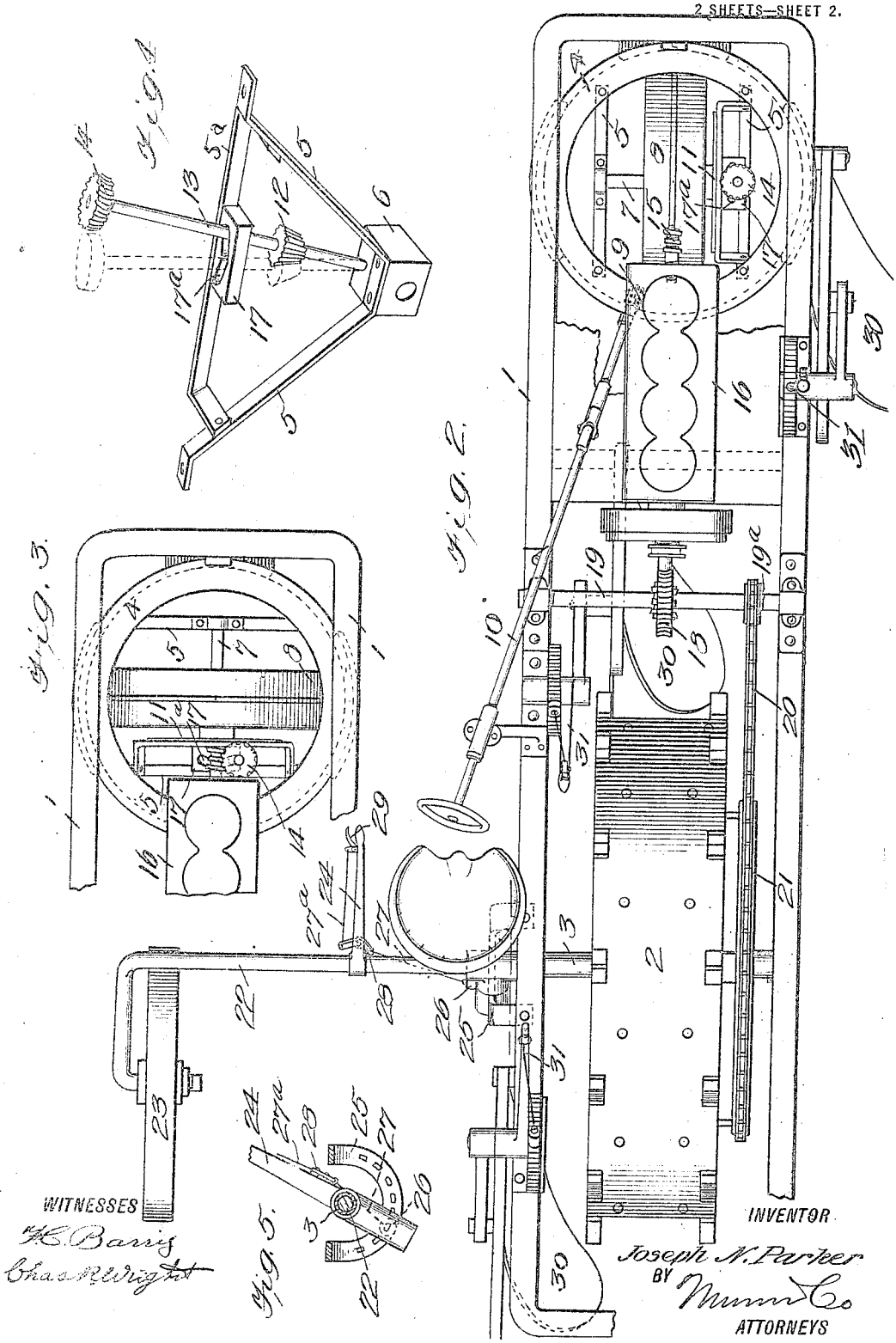

JOSEPH NICHOLAS PARKER, OF BEDFORD, VIRGINIA.

MOTOR.

1,214,361.          Specification of Letters Patent.      Patented Jan. 30, 1917.

Application filed September 27, 1912. Serial No. 722,600.

*To all whom it may concern:*

Be it known that I, JOSEPH N. PARKER, a citizen of the United States, and a resident of Bedford, in the county of Bedford and State of Virginia, have invented a new and useful Improvement in Motors, of which the following is a specification.

My invention relates to motors for agricultural purposes and has for its object to provide a motor with which various farming implements may be used.

A further object of the invention is to provide a motor of the character indicated which can be turned all the way around at the end of a row or corner, the rear traction wheel acting as a center.

With these and other objects in view, the invention consists of the construction and arrangement of parts as hereinafter fully described and pointed out in the claims.

Reference is to be had to the accompanying drawing forming a part of this specification, in which similar characters of reference indicate corresponding parts in all the views.

Figure 1 is a side elevation of the improvement; Fig. 2 is a plan view, partly broken away; Fig. 3 is a plan view of the front part of the machine showing the steering wheel turned at right angles to the frame; and Figs. 4 and 5 are detail views.

In the main part of the frame 1 is mounted the traction wheel 2, the ends of the axle 3 of which are hollow for a purpose hereinafter described. Mounted to turn on the under side of the forward part of the frame 1 is a circular frame 4 from the under side of which depend braces 5 secured at their lower ends to bearings 6 in which the axle 7 of the front or steering wheel 8 is mounted. The frame 4 is provided on its under side with a rack 4ᵃ with which meshes the pinion 9 on the steering rod 10 so that by operating the steering rod, the frame 4 and the front wheel 8 can be turned to the right or left to guide the machine.

On the axle 7 of the steering wheel 8 is a bevel gear wheel 11, with which a pinion 12 on the shaft 13 is adapted to mesh. The shaft 13 is mounted in one of the bearings 6 of the axle 7 and is provided at its upper end with a pinion 14 adapted to mesh with the worm 15 on the shaft of the motor 16, when the front wheel 8 is turned at right angles to the frame as shown in Fig. 3. The motor may be of any type but I preferably employ a gasolene engine as shown in the drawings.

In order that the front wheel may be turned at right angles to the frame the shaft 13 is mounted to swing on one of the bearings 6 and its upper portion is mounted in a bearing 17 having a V-shaped slot 17ᵃ. The bearing 17 is secured to the bar 5ᵃ which connects the braces 5 carrying the bearing 6.

When the wheel 8 is turned at right angles, the pinion 14 coming in mesh with the worm 15 of the motor, forces the shaft 13 into one or the other inclined portions of the slot 17ᵃ of the bearing 17, according to the direction the wheel is turned, and throws the pinion 12 in mesh with the bevel gear wheel 11. In this position the front or steering wheel is driven so that the machine is pulled square around with the rear traction wheel 2 as a center. It is to be understood that whichever side of the worm 15 the pinion 14 is on, determines which way the machine will turn. If the front wheel is turned so that the pinion 12 is on the right hand side of the worm 15 the machine will turn to the right, and if the front wheel is turned so that the pinion is on the left hand side of said worm, the machine will turn to the left. When the machine is running straight ahead, the shaft 13 rests at the middle of the slot 17ᵃ of the bearing 17, with the pinion 12 out of mesh with the beveled gear wheel 11, and the pinion 14 out of mesh with the worm 15 of the motor shaft, as shown in Figs. 1 and 2.

For driving the traction wheel from the motor, the motor is geared by worm gearing 18 to a shaft 19 which is provided with a sprocket wheel 19ᵃ from which a sprocket chain 20 passes to the sprocket wheel 21 on the axle 3 of the traction wheel.

In order to support the machine an extension axle 22 has one end mounted to turn in the hollow end of the axle 3 of the traction wheel 2 and carries at its outer angular end a wheel 23. The axle 22 is turned to raise or lower the wheel 23 to adjust the machine to the level of the ground by means of a lever 24. To lock the axle 22 in the position to which it has been adjusted, an apertured segment is mounted upon the frame and with the apertures thereof a catch 26 engages. The catch 26 is connected by a link 27 with a bell crank lever 28 on the lever 24 and said bell crank lever is connected by a link 27ᵃ with a small lever 29 on the lever 24 at its handle end.

As shown in Figs. 1 and 2 of the drawings, three plows are employed one at the center and one at each side. These plows 30 each have their shanks pivoted to the frame, and are provided with operating levers 31 for adjusting them. If desired, the plow at the left hand side can be removed and secured to the frame directly in rear of the traction wheel. As will be seen the traction wheel travels in the furrow made by the front middle plow and the spikes thereof subsoil every third row.

It will thus be seen that I have provided a simple, cheap and effective motor and one with which various farming implements may be readily used.

I claim:—

1. In a motor of the character described, a frame, a pivoted steering wheel, means for turning the wheel at right angles to the frame in either direction, and means controlled by the turning of the said wheel for driving the same while at right angles to the frame.

2. In a motor of the character described, a frame, a motor on the frame, a pivoted steering wheel, means for turning the wheel at right angles to the frame in either direction, and gearing between the motor and wheel when at right angles to the frame, said gearing being out of mesh when the steering wheel is in normal position.

3. In a motor of the character described, a frame, a motor having a gear on its shaft, a pivoted steering wheel, a gear on the axle of the wheel, means for turning the wheel at right angles to the frame, and a swinging shaft having gears thereon to mesh with the gear of the motor shaft and the gear of the axle of the steering wheel when the said wheel is at right angles to the frame.

4. In a motor of the character described, a frame, a motor having a worm on its shaft, a frame mounted to turn on the main frame, a steering wheel mounted in the said frame, a gear wheel on the axle of the steering wheel, means for turning the frame to bring the steering wheel at right angles to the frame, a bearing secured to the turning frame and having a V-shaped slot therein, and a shaft mounted to swing in one of the bearings of the axle of the steering wheel and working in the slot of said bearing, said shaft being provided with two pinions, said pinions meshing with the worm of the motor shaft and the gear wheel of the axle of the steering wheel when the said steering wheel is at right angles to the frame.

5. In a motor of the character described, a frame, a motor having a worm on its shaft, a frame mounted to turn on the main frame and having a rack on one face, a steering wheel mounted on the said frame, a bevel gear wheel on the axle of the steering wheel, a pinion meshing with the rack, an operating rod operating the pinion, a bearing secured to the turning frame and having a V-shaped slot therein, and a shaft mounted to swing in one of the bearings of the axle of the steering wheel and working in the slot of said bearing, said shaft being provided with pinions adapted to mesh with the worm of the motor shaft and the bevel gear wheel of the axle of the steering wheel, when said steering wheel is turned at right angles to the frame.

6. In a motor of the character described, a frame, a pivoted steering wheel, means for turning the wheel at right angles to the frame in either direction, means for operating said wheel from the motor only when said wheel is at right angles, said means being automatically brought into action upon the completion of the turning movement of said wheel.

7. In a motor of the character described, a frame, a motor, a pivoted steering wheel, means for turning the wheel at right angles to the frame in either direction, a swinging shaft, means for swinging and operating the shaft from the motor only when the wheel is turned at right angles, and means for operating the steering wheel from said shaft.

8. In a motor of the character described, a frame, a motor having a gear on its shaft, a turn table mounted at the front of said frame, a steering wheel carried by said turn table, a circular rack on said turn table, a manually operated pinion engaging said rack to turn the said wheel, a gear on the axle of the wheel and a movable shaft having gears thereon to mesh respectively with the gear of the motor shaft and the gear of the axle of the steering wheel only when the said wheel is at right angles to the frame.

JOSEPH NICHOLAS PARKER.

Witnesses:
R. E. WHITE,
J. C. PARKER.

Copies of this patent may be obtained for five cents each, by addressing the "Commissioner of Patents, Washington, D. C."